(12) United States Patent
Joo (10) Patent No.: US 9,882,912 B2
(45) Date of Patent: Jan. 30, 2018

(54) SYSTEM AND METHOD FOR PROVIDING AUTHENTICATION SERVICE FOR INTERNET OF THINGS SECURITY

(71) Applicant: WINS CO., LTD, Seongnam-Si, Gyeonggi-do (KR)

(72) Inventor: Eun Young Joo, Seoul (KR)

(73) Assignee: WINS CO., LTD., Seoul (KR)

( * ) Notice: Subject to any disclaimer, the term of this patent is extended or adjusted under 35 U.S.C. 154(b) by 108 days.

(21) Appl. No.: 14/968,856

(22) Filed: Dec. 14, 2015

(65) Prior Publication Data
US 2016/0173495 A1    Jun. 16, 2016

(30) Foreign Application Priority Data
Dec. 16, 2014  (KR) .................... 10-2014-0181720

(51) Int. Cl.
*H04L 29/06* (2006.01)
(52) U.S. Cl.
CPC ............ *H04L 63/102* (2013.01); *H04L 63/08* (2013.01); *H04L 63/1425* (2013.01)
(58) Field of Classification Search
CPC ... H04L 63/08; H04L 63/102; H04L 63/1425; H04L 63/0869; H04L 63/0876; H04L 63/1466; G06F 21/30; G06F 21/31
USPC ................ 726/2–6, 22–23; 713/168–171
See application file for complete search history.

(56) References Cited

U.S. PATENT DOCUMENTS

| 9,426,118 | B2* | 8/2016 | Kim | .................. H04L 63/02 |
| 9,426,153 | B2* | 8/2016 | Kim | ................ H04L 41/0806 |
| 9,436,819 | B2* | 9/2016 | Priev | .................. G06F 21/44 |
| 9,461,976 | B1* | 10/2016 | Smith | .................. H04L 63/062 |
| 9,621,530 | B2* | 4/2017 | Lin | ...................... H04L 63/08 |
| 2014/0167931 | A1 | 6/2014 | Lee et al. | |
| 2015/0128205 | A1* | 5/2015 | Mahaffey | ............... H04L 63/20 726/1 |

FOREIGN PATENT DOCUMENTS

KR    10-1173810 B1    8/2012

OTHER PUBLICATIONS

Korean Patent Abstract (in English) of KR Pub. No. 101173810 B1, Pub. Date Aug. 16, 2012, downloaded on Jun. 20, 2016 from http://kpa.kipris.or.kr.

(Continued)

*Primary Examiner* — Hosuk Song
(74) *Attorney, Agent, or Firm* — Barcelo, Harrison & Walker, LLP (57) ABSTRACT

A system and method for providing authentication service for IoT security are disclosed herein. The system for providing authentication service for IoT security includes an Internet of Things (IoT) service server, and an IoT gateway node. The IoT service server supports an IoT communication service in accordance with an IoT communication service policy. The IoT gateway node receives an IoT service request from a terminal attempting to control an IoT device that supports the IoT communication service while operating in conjunction with the IoT service server, identifies whether the terminal attempting to control the IoT device is a normal user based on profile information, collected from the terminal via the IoT service request, via the IoT service server, and performs the security authentication of the IoT device.

14 Claims, 5 Drawing Sheets

(56) References Cited

OTHER PUBLICATIONS

Office Action, dated Mar. 21, 2016; Issued by Korean Intellectual Property Office; App. No. 10-2014-0181720 (in Korean).

* cited by examiner

SYSTEM AND METHOD FOR PROVIDING AUTHENTICATION SERVICE FOR INTERNET OF THINGS SECURITY

CROSS-REFERENCE TO RELATED APPLICATIONS

This application claims priority from Korean Patent Application No. 10-2014-0181720, filed on Dec. 16, 2014, in the Korean Intellectual Property Office. The entire contents of said application are incorporated herein by reference.

BACKGROUND

1. Technical Field

The present invention relates generally to the provision of a network security policy and, more particularly, to the user authentication of a security hub for Internet of Things (IoT) security and the authentication and control of an IoT device for the user authentication.

2. Description of the Related Art

The Internet has been utilized as a space in which people can share information as the producers/consumers of information. In the future, it is expected that an IoT era in which surrounding things, such as home appliances and sensors, are connected to a network and the environmental information of surrounding things and information about things themselves can be shared will arrive. As the concept of controlling and managing things via the Internet had spread, a variety of types of products have emerged.

As an IoT era emerges, it is expected that communication between things will be performed in various ways. Devices supporting the IoT, such as sensors and home appliances, may be accessed via a smart phone, i.e., a kind of device supporting IoT.

For this purpose, information about various devices and applications that can be accessed need to be searched for, and information about authentication and an access Internet protocol (IP) required to access found things needs to be easily obtained.

However, as the instructions of IoT communication for such IoT devices have been standardized, basic technologies for remotely controlling the IoT devices have emerged, and remote control products via the Internet and telephones have emerged. Accordingly, this increased convenience has resulted in an increase in the vulnerability of security.

IoT services are now in an early stage, and have different types of vulnerability because the specifications, instructions and security management of IoT products related to security authentication have not been unified.

SUMMARY

At least one embodiment of the present invention is directed to the provision of a technology for enabling secure and mutual access using an IoT security hub operating in conjunction with IoT devices within an IoT communication service network in order to perform mutually authenticated security access via secure IoT communication between various devices supporting IoT communication services.

In accordance with an aspect of the present invention, there is provided A method of providing authentication service for Internet of Things (IoT) security, including: sending, by a terminal attempting to control an IoT device that supports an IoT communication service via the IoT communication service, an IoT service request to an IoT gateway node by executing an IoT service-related browser; determining whether the terminal attempting to control the IoT device is a normal user, based on profile information collected from the terminal via the IoT service request, and determining whether a control command to control the IoT device has been generated if, as a result of the determination, the terminal is a normal user; if a control command has been generated, monitoring the interval of each occurrence period of the control command, and determining a malicious behavior type based on the result of checking whether the interval exceeds a predetermined interval threshold; and blocking the IoT communication service or attempting re-authentication of the terminal based on the malicious behavior type.

In accordance with another aspect of the present invention, there is provided a system for providing authentication service for IoT security, including: an Internet of Things (IoT) service server configured to support an IoT communication service in accordance with an IoT communication service policy; and an IoT gateway node configured to receive an IoT service request from a terminal attempting to control an IoT device that supports the IoT communication service while operating in conjunction with the IoT service server, to identify whether the terminal attempting to control the IoT device is a normal user based on profile information, collected from the terminal via the IoT service request, via the IoT service server, and to perform the security authentication of the IoT device.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail with reference to the accompanying drawings. In the following description, specific details, such as specific components, are described. These are provided merely to help a general understanding of the present invention. It will be apparent to those skilled in the art that modifications or variations can be made to the specific details within the scope of the present invention.

Embodiments of the present invention relate to the user authentication of a security hub for IoT security and the authentication and control of an IoT device for the user authentication. More particularly, according to embodiments of the present invention, in order to perform mutually authenticated security access via secure IoT communication between various devices that support IoT communication services, the profile information of a specific data region within a service request message requested by a terminal that attempts to control an IoT device is extracted. Whether the extracted profile information is identical with the authentication information of the terminal that has been databased and previously registered with an IoT service server is checked in order to check whether the terminal is a normal user. When a control command is generated, malicious behavior, i.e., a flooding or replaying attack type, is checked based on the occurrence period of a control command packet. An attack is selectively prepared for depending on the corresponding attack type. If the control command corresponds to a state monitoring command, the undiscerning blocking of a malicious behavior is rejected by monitoring the erroneous operation of an IoT device. Another attack is gradually checked based on a command occurrence period from a specific attack in order to protect IoT devices within an IoT service network more securely. If a malicious behavior has been found, attack behavior and the erroneous operation of a device itself are clearly distinguished from each other by differently applying commands for controlling the IoT devices. Accordingly, the loss of IoT service activation attributable to the blocking of a malicious behavior can be minimized.

Furthermore, a terminal according to embodiments of the present invention is a terminal that is capable of IoT communication service, and is a computing device for general purposes or a specific purpose, such as a personal computer (PC), a notebook computer, a laptop computer, or a handheld terminal. The terminal is construed as being based on a concept that collectively refers to terminals on which a microprocessor is mounted and which may perform a specific computation operation.

The terminal may include all types of information and communication devices, such as digital broadcasting terminals, personal digital assistants (PDAs), smart phones, tablet PCs, iPad, and 3G terminals, for example, international mobile telecommunication 2000 (IMT-2000) terminals, wideband code division multiple access (WCDMA) terminals, global system for mobile communication packet radio service (GSM/GPRS) and universal mobile telecommunication service (UMTS) terminals, and multimedia devices. It will be apparent to those skilled in the art that all the configurations of the embodiments, described in the present specification, except for configurations limited only to portable terminals, may also be applied to fixed terminals, such as digital TVs and desktop computers.

A method of providing authentication service for IoT security according to an embodiment of the present invention is described in detail with reference to FIGS. 1 and 2.

Figure 1:
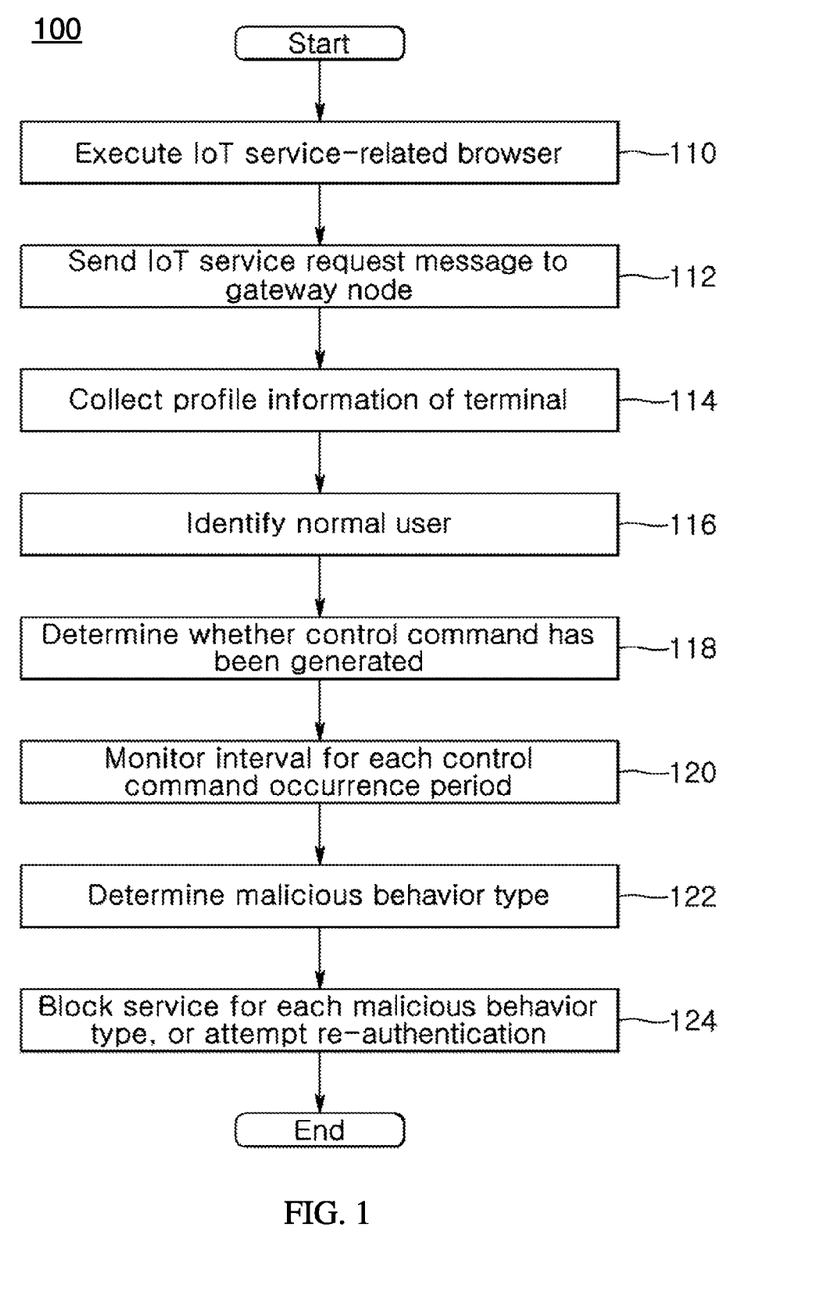
FIG. 1 is a schematic flowchart illustrating a method of providing authentication service for IoT security according to an embodiment of the present invention.

First, FIG. 1 is a schematic flowchart illustrating the method of providing authentication service for IoT security according to the embodiment of the present invention.

Referring to FIG. 1, at step 110, a terminal that attempts to control an IoT device supporting an IoT communication service via the IoT communication service executes an IoT service-related browser. At step 112, the terminal that attempts to control the IoT device requests an IoT service from an IoT gateway node within an IoT service network by executing the IoT service-related browser.

In this case, the IoT service is based on the concept of a network of things that forms intelligent relationships, such as sensing, networking, and information processing, in a mutually cooperative manner without the explicit intervention of a human with respect to three distributed environmental elements, i.e., humans, things, and services. Things, i.e., one major element of IoT, includes persons, vehicles, bridges, various types of electronic equipment, cultural assets, and physical objects forming a natural environment in addition to communication equipment in wired/wireless networks. The IoT expands the concept of M2M capable of intelligent communication between a human and a thing and between things over a network to the Internet, and interacts with all information in the real world and a virtual world in addition to things.

A network communication service technology applied to an embodiment of the present invention is an IoT service interface technology, and functions to associate the major elements (i.e., humans, things, and services) of IoT with an application service that performs a specific function.

In an embodiment of the present invention, a device that is included within an IoT service network or a terminal that attempts to control the device includes terminals including a sensing technology, communication technology, and service technology, i.e., major technologies for IoT.

An IoT device that is included within an IoT service network or a terminal that attempts to control the devices includes terminals that are interconnected via IoT communication in response to the manipulation or command of a user and that send and receive various data. In this case, the user of a terminal that attempts to control an IoT device previously registers profile information with an IoT service server in order to access a device supporting IoT within the IoT service network via the browser of the device.

Furthermore, each of a plurality of IoT devices within the IoT service network is a terminal that performs data communication using IoT communication. The IoT device includes memory for storing a program or protocol for communication with an IoT service server for mutual communication or authentication and a gateway node, and a processor for performing computation and control by executing a corresponding program. Accordingly, if communication with the IoT service server and gateway node for mutual communication or authentication between the IoT device within the IoT service network and the terminal that attempts to control the IoT device is possible, any terminal may be used, and may perform mutual communication using a communication application for IoT communication. That is, the terminal that attempts to control the IoT device may run a communication application (or browser) in response to an IoT service request, and may access the IoT device via the communication application.

Thereafter, at step 114, the IoT gateway node collects the profile information of the terminal by detecting information recorded on a specific region of the IoT service request message received from the terminal that attempts to control the IoT device.

In this case, the profile information of the terminal is information required for the IoT service authentication of the terminal. As described above, in order to access the IoT device within the IoT service network, the profile information is previously registered with the IoT service server. When the IoT device is accessed, one or more of unique ID information intended for a distinction from other terminals, MAC address information, and encryption key information based on a public key-based key sharing mechanism are included in and recorded on a specific region of a data field when the IoT service request message is generated.

In this case, the encryption key information based on a public key-based key sharing mechanism is generated when an IoT device generates a personal key corresponding to a public key based on the public key in accordance with a common encryption algorithm, for example, a Rivest Shamir Adleman (RSA) algorithm. A terminal according to an embodiment of the present invention shares the public key with the IoT service server, and performs encryption and decoding within an IoT communication service network using the public key.

At step 116, the IoT gateway node identifies whether the terminal that attempts to control the IoT device is a normal user based on the profile information collected from the terminal via the IoT service request.

Whether the terminal is a normal user is identified in such a manner that the IoT gateway node determines whether profile information included in a message when the IoT service request is received matches the authentication information of the terminal registered with the IoT service server.

In this case, the authentication information includes one or more of ID information required to identify the terminal, information about the MAC address of the terminal, and encryption key information based on a public key-based key sharing mechanism. When the terminal that attempts to control the IoT device generates the IoT service request message for accessing the IoT device, one or more of unique ID information intended for a distinction from other terminals, MAC address information, and encryption key information based on a public key-based key sharing mechanism are included in and recorded on a specific region of a data field.

Thereafter, at step 118, it is determined whether a control command to control the IoT device has been generated. If it is determined that the control command has been generated, the interval of each occurrence period of the control command is monitored at step 120. A malicious behavior type is determined based on the result of checking whether the interval has exceeded a predetermined interval threshold at step 122, and IoT communication service is blocked or the re-authentication of the terminal is attempted based on the determined malicious behavior type at step 124.

This are described in more detail with reference to FIG. 2A and FIG. 2B.

Figure 2A:
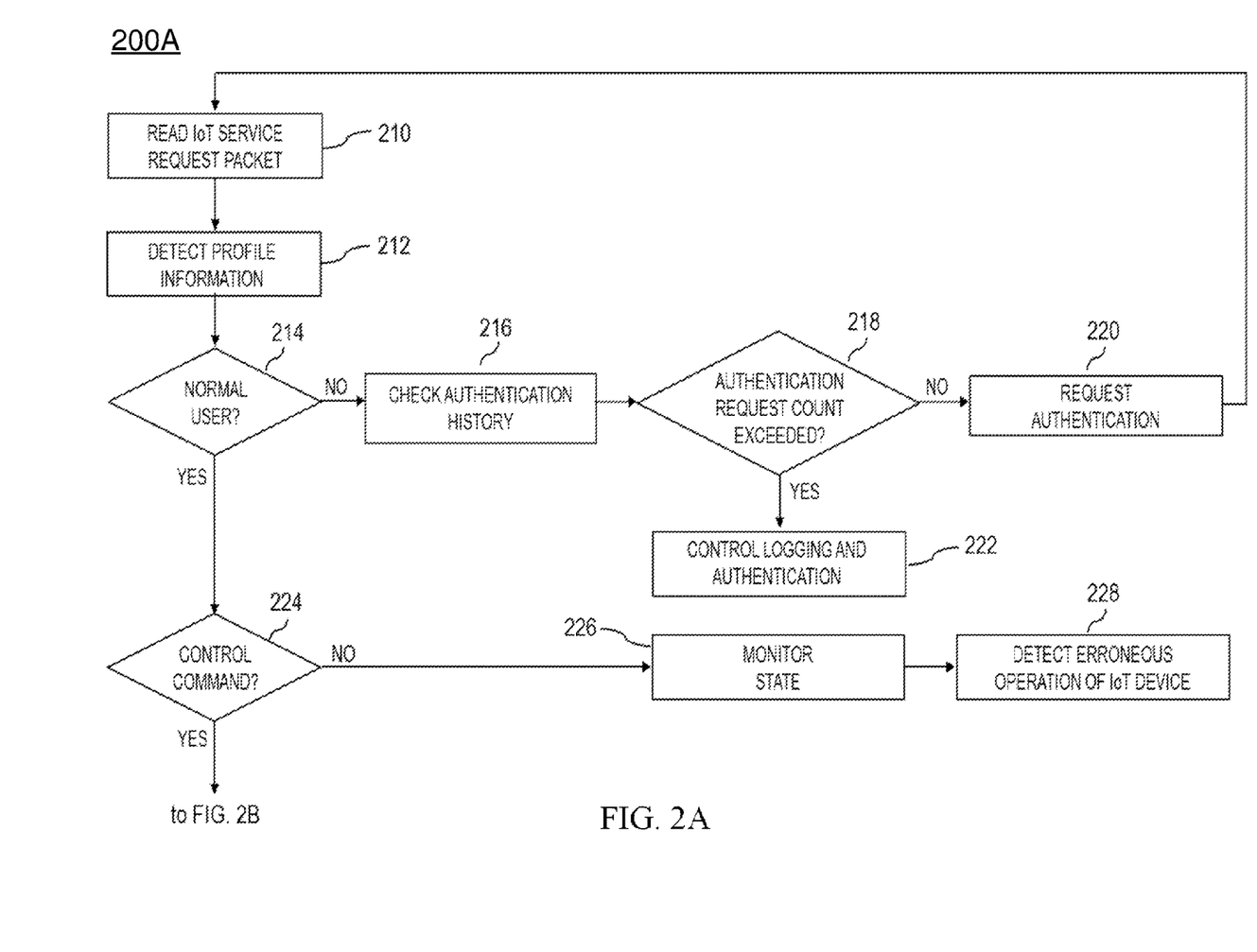
FIG. 2A and FIG. 2B jointly comprise a single detailed flowchart illustrating security authentication according to a malicious behavior type in an IoT gateway node in the method of providing authentication service for IoT security according to an embodiment of the present invention.
Figure 2B:
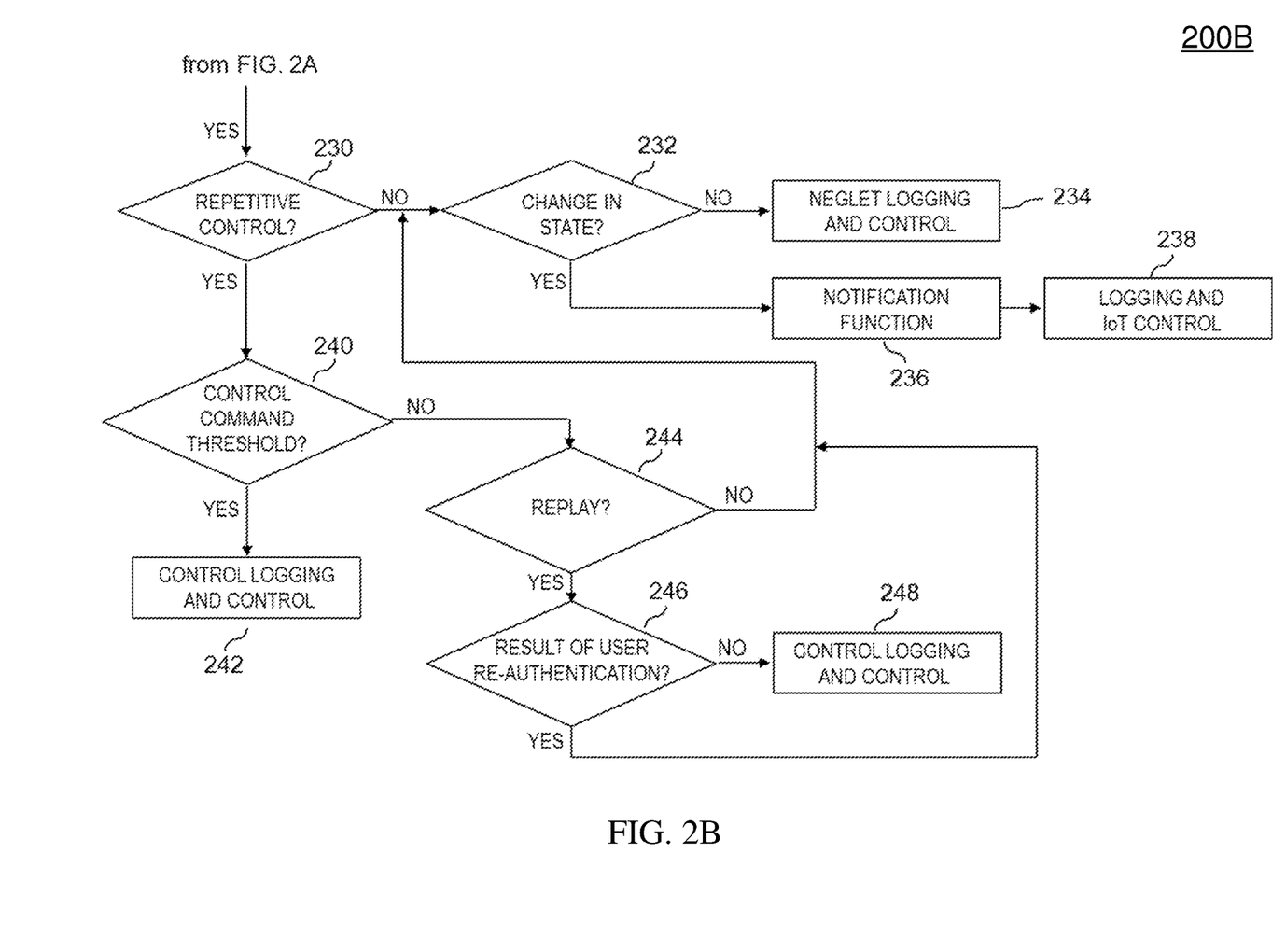

FIG. 2A and FIG. 2B jointly comprise a single detailed flowchart illustrating security authentication depending on a malicious behavior type in an IoT gateway node in the method of providing authentication service for IoT security according to the embodiment of the present invention.

Referring to FIG. 2A, at step 210, the IoT gateway node receives a packet related to the IoT service request message from the terminal that attempts to control the IoT device, and reads the packet.

At step 212, the IoT gateway node detects profile information recorded on a specific region field of the read packet data.

In this case, the profile information includes one or more of unique ID information intended for a distinction from other terminals, MAC address information, and encryption key information based on a public key-based key sharing mechanism that are included in and recorded on a specific region of a data field when the terminal generates the IoT service request message.

At step 214, the IoT gateway node checks whether the terminal that attempts to control the IoT device is a normal user.

In this case, whether the terminal that attempts to control the IoT device is a normal user is checked via the operation of detecting the profile information at step 214. The profile information is information required for the IoT service authentication of the terminal. In order to access the device within the IoT service network, the terminal previously registers the profile information with the IoT service server. Furthermore, when generating the IoT service request message, the terminal includes and records one or more of the unique ID information intended for a distinction from other terminal, the MAC address information, and the encryption key information based on a public key-based key sharing mechanism in and on the specific region of the data field when generating the profile information.

If, as a result of the checking, the profile information included in the IoT service request message matches the authentication information of the terminal that has been registered with the IoT service server and thus the terminal is found to be a normal user, the process proceeds to step 224. If the terminal is found not to be a normal user, the process proceeds to step 216.

At step 224, it is checked whether a specific command to control the IoT device has been generated. If the generated command is found not to be a control command, a state monitoring message for the IoT device supporting IoT communication service in accordance with an IoT communication service policy is recognized at step 226, and an event obtained by monitoring state information about each of the IoT devices distributed within the IoT service network is detected at step 228. In this case, the term "event" refers to one of the abnormal operations within the IoT service network, including erroneous operation, the loss of the transmission packet of the IoT device, and traffic exceeding a threshold within the IoT service network.

If, as a result of the checking at step 214, the terminal is found not to be a normal user, the IoT gateway node detects an authentication history from the IoT service server based on the collected profile information and then checks the authentication history of the terminal at step 216. If a predetermined authentication request count is found to be exceeded at step 218, the process proceeds to step 222 of blocking the authentication of the terminal via a logging and authentication control operation. If the predetermined authentication request count is found not to be exceeded at step 218, an authentication request message including authentication permission information is output at step 220.

Furthermore, if the generated command is found to be a control command at step 224, it is checked whether the generated control command is a repeated control command at step 230.

Referring to FIG. 2B, step 230 corresponds to the operation of determining a malicious behavior attack (e.g., a flooding or replaying attack) by determining whether the command is a single-period repetitive control command in accordance with a predetermined security policy. The flooding attack is an attack intended to apply a load so that the operation itself of the IoT device cannot be normally performed, and causes the erroneous operation of the IoT device. The replaying attack is an attack intended to previously copy a control command to the IoT device over the Internet and to play back the control command, and can repeat the same behavior pattern as a user.

If it is determined that the control command is a repetitive control command, the IoT gateway node compares the interval with a predetermined interval threshold at step 240. If the control command is found not to be a repetitive control command, the IoT gateway node checks whether the control command is a state change message for all or a specific one of the IoT devices distributed in the IoT service network at step 232. If, as a result of the checking, the control command is found to be a command regarding a change in the state, the IoT gateway node performs logging and IoT device control via a notification service at step 236. If, as a result of the checking, the control command is found not to be a command regarding a change in the state, the IoT gateway node neglects the IoT service logging and IoT device control of the terminal at step 234.

If the interval does not exceed the predetermined interval threshold at step 240, the IoT service logging and IoT device control of the terminal is controlled at step 242. If the interval exceeds the predetermined interval threshold at step 240, it is checked whether the repetitive control command is a replaying attack defined in a predetermined security policy at step 244 and the period type of the repetitive control command is determined based on the result of the checking.

In this case, the period type is a regular period, or a common period defined in an IoT service policy. If the repetitive control command is regular, the re-authentication of the terminal is requested, and control via IoT device control logging and notification service is performed.

If, as a result of the checking at step 244, the repetitive control command is found to be a replaying attack intended to copy the control command to the IoT device over the Internet, play back the copied control command and repeat the same behavior pattern as the user, it is checked whether user re-authentication has been performed at step 246. If, as a result of the checking, the user re-authentication has not been performed, logging and control for IoT communication service are performed at step 248. If, as a result of the checking, the user re-authentication has been performed, a subsequent operation is performed by checking whether the control command is a state change message at step 232.

The method of providing authentication service for IoT security according to the embodiment of the present invention has been described above.

A system for providing authentication service for IoT security according to an embodiment of the present invention is described in detail below with reference to FIGS. 3 and 4.

Figure 3:
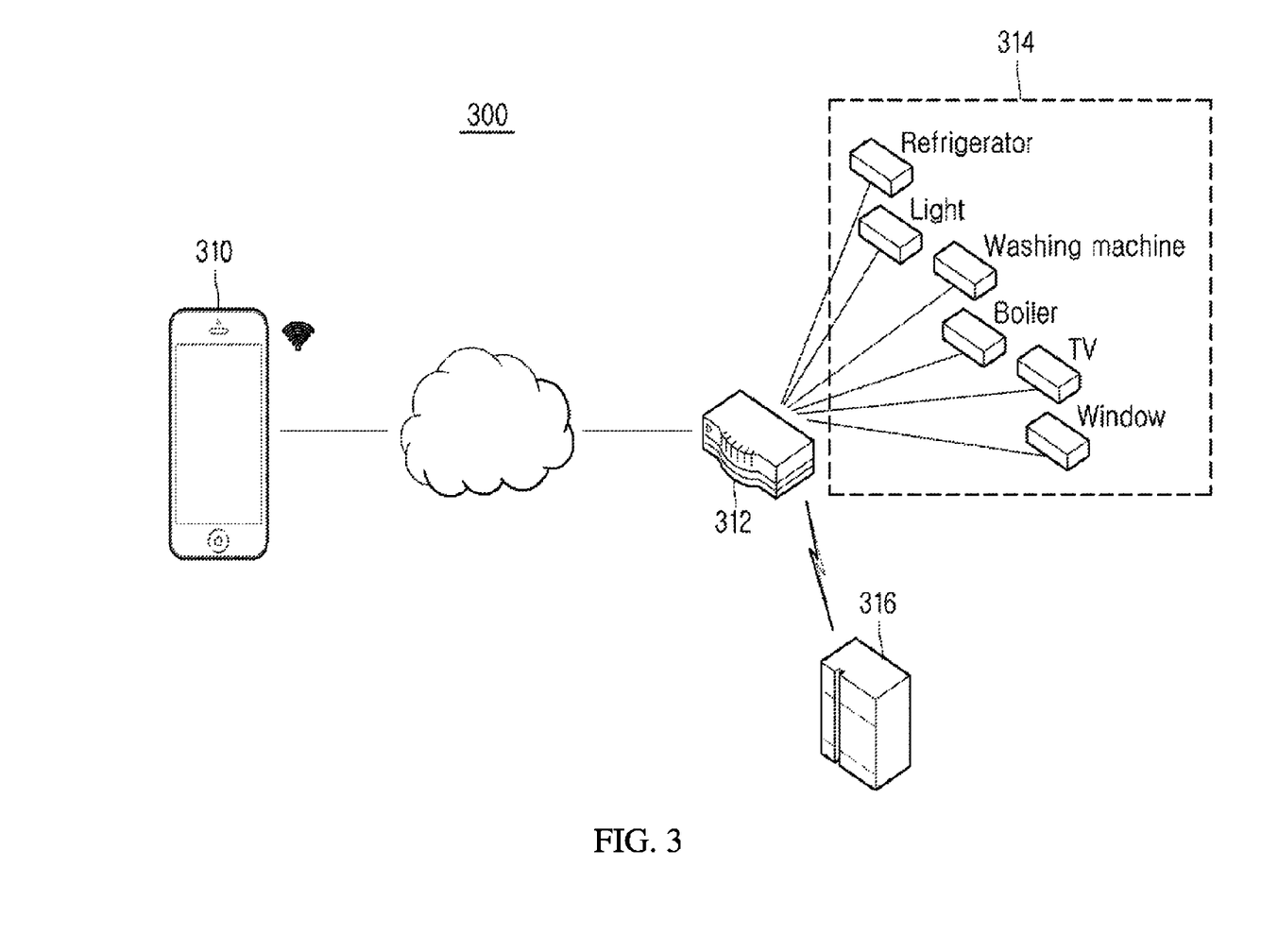
FIG. 3 is a diagram illustrating the schematic configuration of a system for providing authentication service for IoT security according to an embodiment of the present invention.

FIG. 3 is a diagram illustrating the schematic configuration of the system for providing authentication service for IoT security according to the embodiment of the present invention.

Referring to FIG. 3, the system 300 to which the embodiment of the present invention has been applied includes a terminal 310 attempting to control an IoT device, an IoT gateway node 312, an IoT service server 316, and an IoT device group 314.

The terminal 310 is a device capable of IoT communication, and refers to a terminal whose profile information has been registered with the IoT service server 316 by a user. The terminal 310 in which a communication application has been installed may perform communication with devices within the IoT device group 314, and may control IoT communication with each of the devices within the IoT device group 314 via the communication application.

The IoT service server 316 supports IoT communication service in accordance with an IoT communication service policy.

The gateway node 312 receives an IoT service request from the terminal 310 that attempts to control an IoT device supporting IoT communication service while operating in conjunction with the IoT service server 316, determines whether the terminal 310 that attempts to control an IoT device is a normal user via the IoT service server 316 based on profile information collected from the terminal 310 via the IoT service request, and performs the security authentication of the IoT device.

The gateway node 312 is described in more detail below with reference to FIG. 4.

Figure 4:
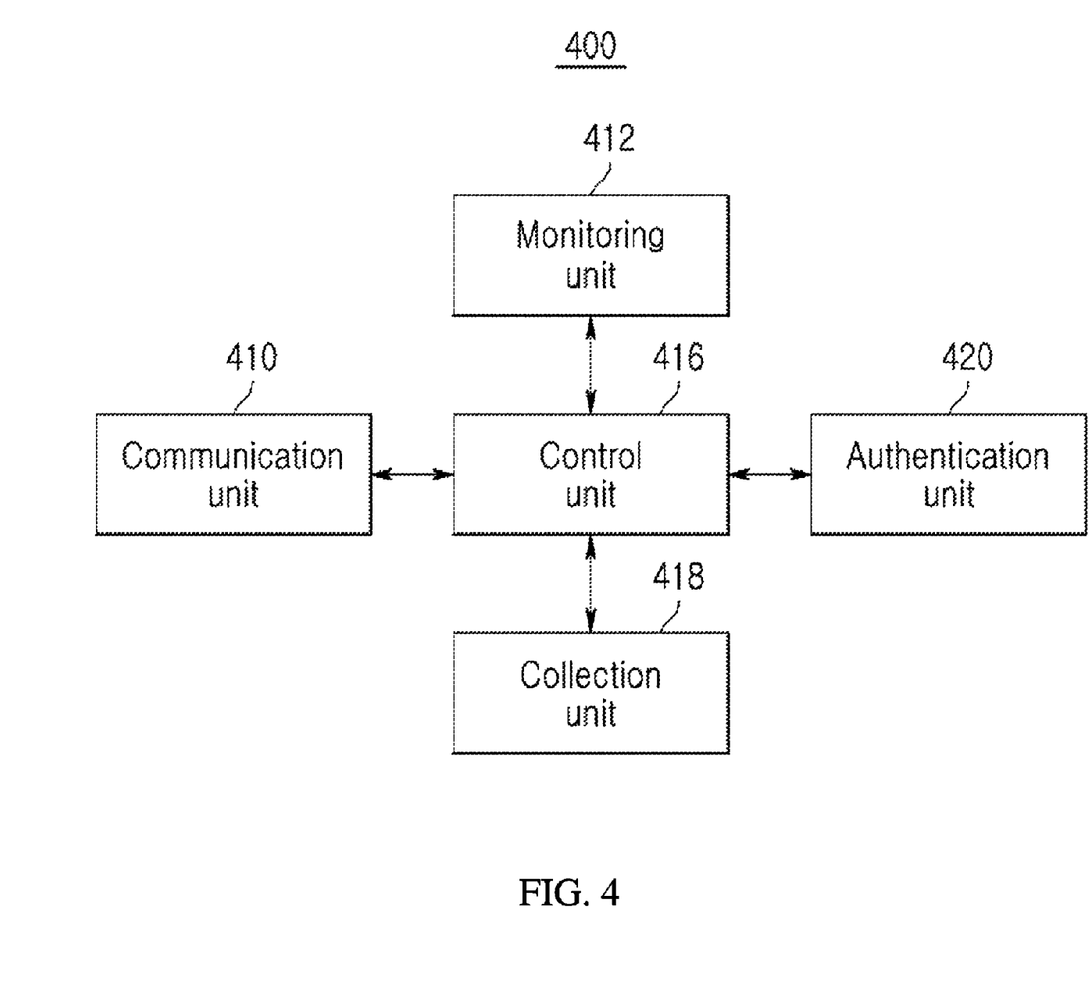
FIG. 4 is a detailed block diagram illustrating an IoT gateway node in the system for providing authentication service for IoT security according to an embodiment of the present invention.

FIG. 4 is a detailed block diagram illustrating the IoT gateway node in the system for providing authentication service for IoT security according to the embodiment of the present invention.

The gateway node 400 to which the embodiment of the present invention has been applied includes a communication unit 410, a monitoring unit 412, a control unit 416, a collection unit 418, and an authentication unit 420.

The control unit 416 of the IoT gateway node 400 collects the profile information of a terminal, which is included in an IoT service request message output by the communication unit 410, via the collection unit 418, and determines whether the terminal is a normal user. If the terminal is a normal user, the control unit 416 determines whether a generated command is a control command to control an IoT device via the monitoring unit 412. If the control command has been generated, the control unit 416 monitors the interval of each control command period, and determines a malicious behavior type based on whether the interval exceeds a predetermined interval threshold.

Furthermore, the control unit 416 performs control based on the determined malicious behavior type so that the IoT communication service of the terminal that requests IoT service is blocked or the re-authentication of the terminal is performed.

Furthermore, the control unit 416 identifies a normal user by performing control so that whether profile information included in a message when an IoT service request is received matches the authentication information of the terminal that has been registered with the IoT service server is determined via the authentication unit 420.

If, as a result of the identification, the terminal is not a normal user, the control unit 416 detects an authentication history from the IoT service server based on the collected profile information. If the authentication history of the terminal exceeds a predetermined authentication request count, the control unit 416 blocks the authentication of the terminal. If the authentication history of the terminal does not exceed the predetermined authentication request count, the control unit 416 outputs an authentication request message including authentication permission information.

In this case, the authentication information includes one or more of unique ID information required to identify the terminal, information about the MAC address of the terminal, and encryption key information based on a public key-based key sharing mechanism.

If a control command has not been generated, the control unit 416 recognizes a state monitoring message for an IoT device supporting the IoT communication service in accordance with an IoT communication service policy, and detects an event by monitoring state information about each of the IoT devices distributed within an IoT service network.

Furthermore, the control unit 416 determines whether the control command is a single-period repetitive control command based on predetermined security policy via the monitoring unit 412. If, as a result of the determination, the control command is a repetitive control command, the control unit 416 allows the interval of each occurrence period of the control command to be monitored in order to compare the interval with a predetermined interval threshold. If the control command is not a repetitive control command based on the result of the comparison, the control unit 416 checks whether the control message is a state change message for all or a specific one of the IoT devices distributed in the IoT service network, and performs control based on the result of the checking so that IoT service logging and IoT device control of the terminal is neglected or logging and IoT device control is performed via a notification service.

Furthermore, if the interval does not exceed the predetermined interval threshold, the control unit 416 controls the IoT service logging and IoT device control of the terminal. If the interval exceeds the predetermined interval threshold, the control unit 416 checks whether the repetitive control command corresponds to a replaying attack defined in a predetermined security policy, and determines the period type of the repetitive control command based on the result of the determination.

In this case, the period type is a regular period or a common period defined in the IoT service policy. If the repetitive control command is regular, the control unit 416 requests the re-authentication of the terminal, and performs control via the IoT device control logging and notification service.

As described above, the present invention is advantageous in that the indiscriminate blocking of malicious behavior can be avoided, is advantageous in that IoT devices within an IoT service network can be more securely protected by gradually checking another attack from a specific attack based on a command occurrence period, and is advantageous in that the loss of IoT service activation attributable to the blocking of malicious behavior can be minimized by clearly determining an attack behavior and the erroneous operation of a device itself by differently applying commands for actual IoT device control when a malicious behavior is determined.

The operations of the method and system for providing authentication service for IoT security according to an embodiment of the present invention may be performed as described above. Although the specific embodiments have been described above, various modifications may be made without departing from the scope of the present invention. Accordingly, the scope of the present invention should not be defined based only on the aforementioned embodiments, but should be defined by the claims and equivalents thereto.

I claim:

1. A method of providing authentication service for Internet of Things (IoT) security, comprising:
    sending, by a terminal attempting to control an IoT device that supports an IoT communication service via the IoT communication service, an IoT service request to an IoT gateway node by executing an IoT service-related browser;
    determining whether the terminal attempting to control the IoT device is a normal user, based on profile information collected from the terminal via the IoT service request, and determining whether a control command to control the IoT device has been generated if, as a result of the determination, the terminal is a normal user;
    if a control command has been generated, monitoring an interval of each occurrence period of the control command, and determining a malicious behavior type based on a result of checking whether the interval exceeds a predetermined interval threshold; and
    blocking the IoT communication service or attempting re-authentication of the terminal based on the malicious behavior type.

2. The method of claim 1, wherein determining whether the terminal attempting to control the IoT device is a normal user is performed by determining, by the IoT gateway node, whether the profile information included in a message when the IoT service request is received matches authentication information of the terminal that has been registered with an IoT service server.

3. The method of claim 2, wherein the authentication information comprises one or more of ID information required to identify the terminal, information about a MAC address of the terminal, and encryption key information based on a public key-based key sharing mechanism.

4. The method of claim 1, further comprising, if the control command has not been generated, recognizing a state monitoring message for the IoT device supporting the IoT communication service in accordance with an IoT communication service policy, and detecting an event by monitoring information about a state of each of IoT devices distributed in a network.

5. The method of claim 1, wherein if it is determined that the terminal is not a normal user, the IoT gateway node detects an authentication history from an IoT service server based on the collected profile information, blocks the authentication of the terminal if the authentication history of the terminal exceeds a predetermined authentication request count, and outputs an authentication request message including authentication permission information if the authentication history of the terminal does not exceed the predetermined authentication request count.

6. The method of claim 1, wherein monitoring the interval of each occurrence period of the control command comprises:
    determining whether the control command is a single-period repetitive control command in accordance with a predetermined security policy;
    comparing the interval with the predetermined interval threshold if, as a result of the determination, it is determined that the control command is a repetitive control command;
    checking whether the control command is a state change message for all or a specific one of IoT devices distributed in a network if, as a result of the determination, it is determined that the control command is not a repetitive control command; and
    neglecting IoT service logging and IoT device control of the terminal, or performing the IoT logging and IoT device control via a notification service based on a result of the checking.

7. The method of claim 1, wherein the malicious behavior type comprises a flooding attack and a replaying attack.

8. The method of claim 1, further comprising:
    controlling IoT service logging and IoT device control of the terminal if the interval does not exceed the predetermined interval threshold;
    determining whether the control command is a replaying attack defined in a predetermined security policy if the interval exceeds the predetermined interval threshold; and
    determining a period type of the repetitive control command based on a result of the determination.

9. The method of claim 8, wherein:
    the period type is a regular period or a common period defined in the IoT service policy; and
    if the repetitive control command is regular, re-authentication is requested from the terminal, and control via the IoT device control logging and notification service is performed.

10. A system for providing authentication service for IoT security, comprising:

an Internet of Things (IoT) service server configured to support an IoT communication service in accordance with an IoT communication service policy; and an IoT gateway node configured to receive an IoT service request from a terminal attempting to control an IoT device that supports the IoT communication service while operating in conjunction with the IoT service server, to identify whether the terminal attempting to control the IoT device is a normal user based on profile information, collected from the terminal via the IoT service request, via the IoT service server, and to perform security authentication of the IoT device, wherein the IoT the IoT gateway node comprises a control unit configured to collect the profile information of the terminal included in a message output by a communication unit when the IoT service request is received via a collection unit, to identify whether the terminal is a normal user based on the collected profile information, to determine whether a control command to control the IoT device has been generated via a monitoring unit if the terminal is a normal user, to monitor an interval of each control command period if the control command has been generated, to compare the interval with a predetermined interval threshold, and to determine a malicious behavior type based on a result of the comparison.

11. The system of claim 10, wherein the control unit blocks the IoT communication service of the terminal requesting the IoT service based on the determined malicious behavior type, or performs control so that the re-authentication of the terminal is performed.

12. The system of claim 10, wherein the control unit identifies whether the terminal is a normal user by performing control so that it is determined via an authentication unit whether the profile information, included in the message when the IoT service request is received, matches authentication information of the terminal that has been registered with the IoT service server.

13. The system of claim 10, wherein the authentication information comprises one or more of ID information required to identify the terminal, information about a MAC address of the terminal, and encryption key information based on a public key-based key sharing mechanism.

14. The system of claim 10, wherein if the control command has not been generated, the control unit recognizes a state monitoring message for the IoT device supporting the IoT communication service in accordance with an IoT communication service policy, and detects an event by monitoring information about a state of each of IoT devices distributed in a network.

* * * * *